United States Patent
Kasashima et al.

(10) Patent No.: US 9,457,532 B2
(45) Date of Patent: Oct. 4, 2016

(54) MOLD FOR INJECTION-MOLDING A GOLF BALL, AND GOLF BALL MANUFACTURING METHOD

(71) Applicant: Bridgestone Sports Co., Ltd., Minato-ku, Tokyo (JP)

(72) Inventors: Atsuki Kasashima, Chichibushi (JP); Yoshio Motegi, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 801 days.

(21) Appl. No.: 13/722,460

(22) Filed: Dec. 20, 2012

(65) Prior Publication Data

US 2014/0175699 A1    Jun. 26, 2014

(51) Int. Cl.
| B29C 45/00 | (2006.01) |
| B29C 33/00 | (2006.01) |
| B29D 99/00 | (2010.01) |
| B29C 45/14 | (2006.01) |
| B29L 31/54 | (2006.01) |

(52) U.S. Cl.
CPC ......... B29D 99/0042 (2013.01); B29C 33/005 (2013.01); B29C 45/14073 (2013.01); B29L 2031/546 (2013.01)

(58) Field of Classification Search
CPC   A63B 45/00; B29D 99/0042; B29C 33/005; B29C 45/14073; B29C 45/14–45/65; B29C 45/14819; B29L 2031/546

USPC ............... 264/278, 328.1; 425/573, 577
See application file for complete search history.

(56) References Cited

U.S. PATENT DOCUMENTS

| 5,798,071 | A | * | 8/1998 | Boehm | ............... | 264/275 |
| 2004/0116209 | A1 | * | 6/2004 | Kasashima | ............... | 473/351 |
| 2008/0303190 | A1 | * | 12/2008 | Wachi | ............... | B29C 45/1615 264/328.8 |

FOREIGN PATENT DOCUMENTS

| JP | H10-508807 A | 9/1998 |
| JP | 10-328329 A | 12/1998 |
| JP | 2006-212057 A | 8/2006 |

* cited by examiner

*Primary Examiner* — Christina Johnson
*Assistant Examiner* — Xue Liu
(74) *Attorney, Agent, or Firm* — Sughrue Mion, PLLC

(57) ABSTRACT

The invention provides a mold for injection-molding a golf ball, which mold has a cavity inner wall with a vertical diameter connecting both poles in a vertical direction thereof that is longer than a horizontal diameter connecting both poles in a horizontal direction thereof. A method of manufacturing golf balls using such a mold is also provided. The use of this mold eliminates molding problems that arise when molding the outermost cover layer of a golf ball, enabling the cover to be stably molded and also making it possible to easily and reliably obtain golf balls of high symmetry in which a cover of uniform thickness has been formed.

6 Claims, 5 Drawing Sheets

MOLD FOR INJECTION-MOLDING A GOLF BALL, AND GOLF BALL MANUFACTURING METHOD

BACKGROUND OF THE INVENTION

The present invention relates to a mold for injection-molding a golf ball and a golf ball manufacturing method, both of which may be advantageously used for molding a golf ball composed of a core encased by a cover of one or more layer, and particularly for forming an outermost cover layer having numerous dimples formed on the surface thereof.

In recent years, there has been a strong desire for golf balls which possess various performance attributes, including not only distance, but also controllability, durability and feel at impact. Satisfying all of these attributes with only one type of material is generally difficult. Hence, the customary practice is to provide the ball with a structure in which a solid core formed of rubber, resin or the like, or a wound core, is encased by a cover of one or more layer, each layer having a particular function. In other words, efforts have been made to achieve a performance which addresses the needs of the player, such as a desire for distance or a desire for controllability, by adjusting the number and thicknesses of the above layers, and also adjusting the formulations, etc. of the materials making up the respective layers.

An injection-molding process is typically used to form the outermost layer of a golf ball having such a structure. Specifically, use is made of a process in which a core or a sphere (referred to below as a "center sphere") composed of such a core encased by one or more intermediate layer (a layer other than the outermost layer of the cover) is placed in the cavity of a given mold, and a cover-forming material (generally a resin composition; sometimes referred to below simply as a "resin") is injected between the center sphere and the inner wall of the cavity. In this case, at the same time that the outermost layer is formed, numerous dimples are formed by numerous dimple-forming protrusions which have been provided on the inner wall of the cavity.

Up until now, molds with the structure shown in FIG. 4 have been commonly used when producing golf balls by the above process. FIG. 4, which is a cross-sectional view showing an example of a conventional mold for injection-molding a golf ball, depicts the state prior to injection of the cover-forming material into the mold cavity.

In FIG. 4, a conventional mold 10 is equipped with a mold body 20 having an upper mold half 20*a* and a lower mold half 20*b* which part at a golf ball equator-based parting line PL and removably mate to form an interior cavity 3 for molding a golf ball, the cavity 3 having an inner wall with numerous dimple-forming protrusions provided thereon; and support pins 40 which can be extended and retracted within pin insertion holes 50 that communicate with the cavity 3. The support pins 40 extend into the cavity to support a center sphere 31; when the support pins 40 are in the retracted state, the end faces thereof define a portion of the inner wall of the cavity 3. Although not shown in the diagram, a total of six support pins 40 are provided at evenly spaced positions—three in the upper mold half 20*a* and three in the lower mold half 20*b*. This diagram schematically shows the structure of a mold for injection-molding a golf ball, although the scale, structure of details and the like differ from those of an actual mold. The same applies as well to the other accompanying diagrams described below.

In the above mold 10, runners 60 and resin gates 70 with channels of given sizes (areas) are formed along the parting surface of the mold body 20 so as to enable a known cover-forming material to be injected between the inner wall of the cavity 3 and the center sphere 31 from a known injection molding machine (not shown). Next, with injection of the cover-forming material, the support pins 40 that were extended into the cavity 3 are retracted, after which cooling is carried out, thereby completing molding of the cover.

However, when a cover is formed using the above mold 10, particularly in cases where a thin cover is formed, a molding problem of the sort described subsequently sometimes arises. This molding problem is described in detail below while referring to the accompanying diagrams.

FIG. 5 shows an enlarged cross-sectional view of the vicinity of the cavity 3 in the conventional mold 10 shown in FIG. 4. For the sake of simplicity, the cross-section shown in FIG. 5 does not include certain elements which appear in FIG. 4, such as the support pins 40 and resin gates 70. FIG. 5A shows the state prior to the injection of resin into the cavity 3, and FIG. 5B shows the state while resin is being injected into the cavity 3, for a case in which a thin cover is to be formed. Also, in FIG. 5, the symbol Q represents poles of the inner wall of the cavity 3 in a vertical direction, and the symbol P represents poles of the inner wall of the cavity 3 in a horizontal direction. The latter poles P lie on the equator of the inner wall of the cavity 3.

In FIG. 5A, the center sphere 31 is held at the center of the cavity 3 by support pins (not shown). At this time, the center sphere 31 has a spherical shape, the inner wall of the cavity 3 is a spherical surface, and the interval between the two has been set so as to be everywhere uniform. Consequently, a vertical diameter connecting the two poles Q, Q in the vertical direction of the inner wall of the cavity 3 and a horizontal diameter connecting the two poles P, P in the horizontal direction are each the same length. The vertical diameter and horizontal diameter are both lengths measured at a surface defined by the inner wall of the cavity 3 were it assumed to have no dimple-forming protrusions thereon (i.e., when the shape of the cavity is a spherical surface, the hypothetical spherical surface defined by the inner wall of the cavity were it assumed to have no dimple-forming protrusions thereon).

Next, when resin is injected into the cavity 3, the resin flows in from the resin gates (not shown) formed along the parting surface and, as shown in FIG. 5B, fills the gap between the inner wall of the cavity 3 and the center sphere 31. At this time, because pressure from the horizontal direction acts upon the center sphere 31, the sphere 31 changes in shape from a true sphere to an approximate ellipsoid which is longer in the vertical direction. Hence, the interval between the inner wall of the cavity 3 and the center sphere 31 widens near both poles P, P in the horizontal direction, whereas the interval between the inner wall of the cavity 3 and the center sphere 31 narrows near both poles Q, Q in the vertical direction. As a result, the cover that is formed over the center sphere 31 becomes thicker near the poles P, P in the horizontal direction and becomes thinner near the poles Q, Q in the vertical direction, and thus has a thickness which differs depending on the position. Moreover, when the interval between the inner wall of the cavity 3 and the center sphere 31 becomes too narrow near the poles Q, Q in the vertical direction, resin may not sufficiently fill the gap near the poles Q, Q in the vertical direction, which may result in molding defects.

Separately, in connection with the ball structure, a desire exists for the formation of thinner covers in order to lower the amount of backspin on shots with driver. In cases where a conventional mold 10 is used to mold a thin cover, the interval between the inner wall of the cavity 3 and the center sphere 31 must be narrowed to accord with the thickness of the cover. However, for the reasons described above, either it has been impossible to achieve the desired quality or molding defects have arisen, making production difficult.

Up until now, this problem has been addressed by changing the molding conditions, such as increasing the injection speed and pressure and increasing the molding temperature (increasing the resin flow properties). However, excessively increasing the injection speed and pressure sometimes leads to a new problem in that the amount of molding flash increases, making the use of grinding as a finishing operation more difficult. If, instead, the molding temperature is increased, discoloration of the resin may occur. Particularly in the case of resins which have been imparted with a non-white color, the color sometimes fades, becoming lighter. As a result, the above problem has yet to be fundamentally resolved.

In the prior art, JP-A 2006-212057 discloses a way of forming a thin cover that entails lowering the injection pressure which acts upon the core during molding by providing a molten resin retractor at the gates of the mold. Methods for suppressing eccentricity of the center sphere include JP-A 10-328329, which discloses a production method that uses a compression mold having a rugby ball-shaped center cavity; and JP-A 10-508807, which discloses a production method wherein an elongated preform is created by injection molding, following which the preform is compression molded and ultimately finished to a spherical shape. However, in the above prior art, either mold fabrication is complex or many steps are required to obtain the finished product. Hence, there remains room for further improvement.

As shown above, various modifications have hitherto been made in order to improve the moldability and quality of golf balls, but a fundamental solution has yet to be found for the problem described above. Accordingly, to further enhance golf ball moldability and quality, a need has existed for a novel approach which is capable of resolving this problem.

SUMMARY OF THE INVENTION

It is therefore an object of the present invention to provide a mold for injection-molding a golf ball, which mold, particularly during formation of the outermost cover layer of a golf ball, resolves the above-described molding problem, enabling the cover to be stably molded and moreover making it possible to easily and reliably obtain golf balls of high symmetry in which a cover of uniform thickness has been formed. A further object of the invention is to provide a method of manufacturing golf balls using such a mold.

To achieve the above objects, the invention provides the following mold for injection-molding a golf ball and the following golf ball manufacturing method.

[1] A mold for injection-molding a golf ball, comprising a plurality of mold sections which have at least a parting surface that is based on a golf ball equator-based mold parting line and removably mate to form an interior cavity for molding the golf ball, the cavity having an inner wall with a plurality of dimple-forming protrusions provided thereon,
wherein at least four resin gates are formed along the parting surface that is based on a golf ball equator-based mold parting line, and
the inner wall has a vertical diameter connecting two poles of the cavity in a vertical direction thereof and a horizontal diameter connecting two poles of the cavity in a horizontal direction thereof, the vertical diameter being longer than the horizontal diameter.

[2] The mold for injection-molding a golf ball of [1], wherein the vertical diameter is at least 0.02 mm longer than the horizontal diameter.

[3] The mold for injection-molding a golf ball of [1], wherein the inner wall of the cavity has a shape which is an approximately ellipsoidal surface that is longer in the vertical direction.

[4] A method of manufacturing a golf ball using the mold for injection-molding a golf ball of [1], comprising the step of molding a cover by placing a center sphere in the mold cavity formed by removably mating the plurality of mold sections which have at least a parting surface that is based on a golf ball equator-based mold parting line, supporting the center sphere with a support pin provided in the mold, and injecting a cover-forming material between the center sphere and the cavity inner wall while at the same time retracting the support pin.

BRIEF DESCRIPTION OF THE DIAGRAMS

FIG. 1 is a cross-sectional view of a mold for injection-molding a golf ball according to an embodiment of the invention.

FIG. 2 presents enlarged cross-sectional views of the vicinity of the cavity in the mold shown in FIG. 1, FIG. 2A depicting the state prior to the injection of a resin into the cavity and FIG. 2B depicting the state when resin is being injected into the cavity.

Figure 4:
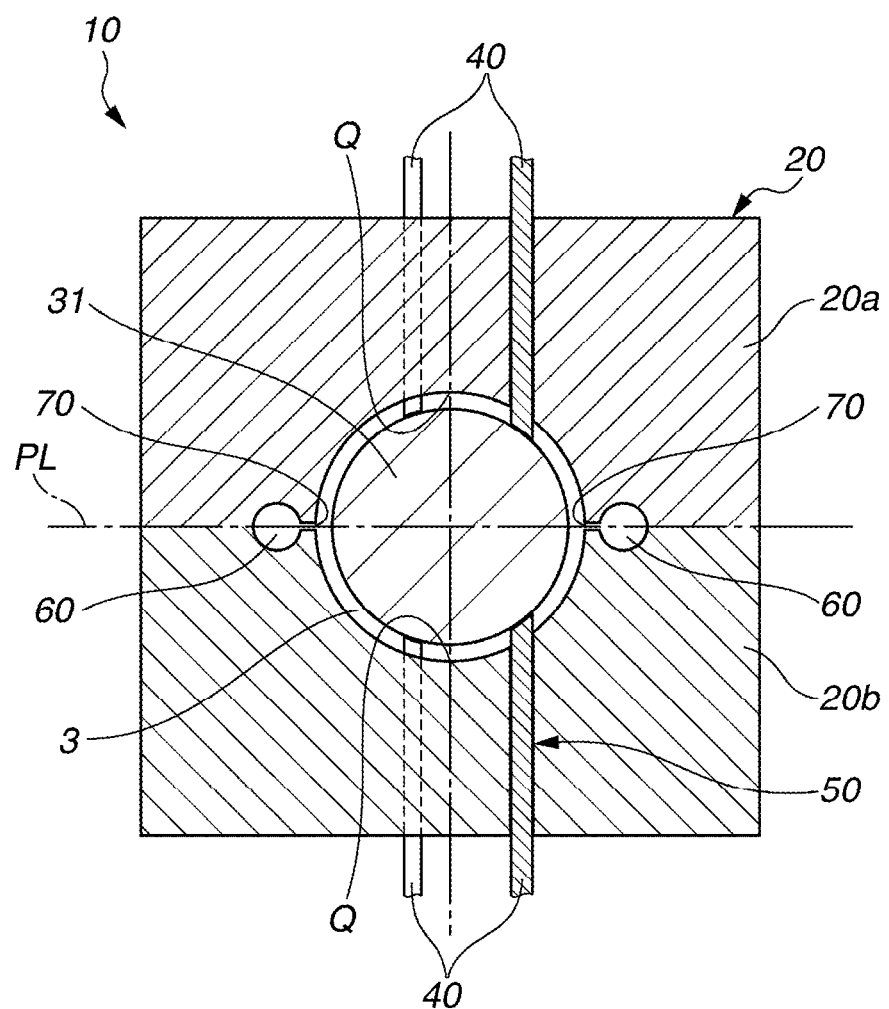
FIG. 4 is a cross-sectional view showing a conventional mold for injection-molding a golf ball.
Figure 5A:
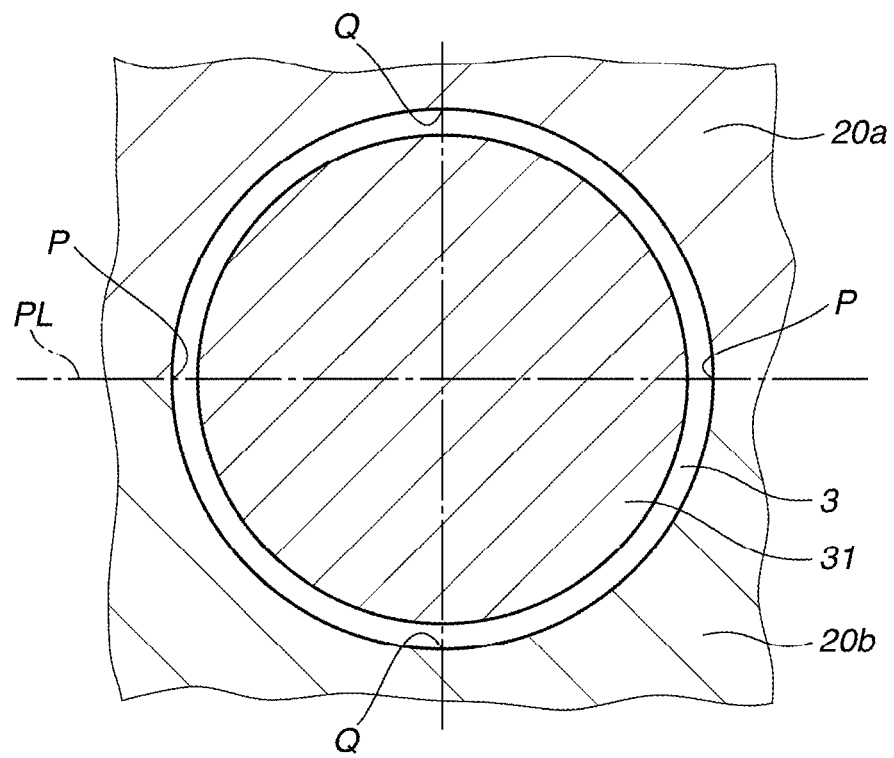
Figure 5B:
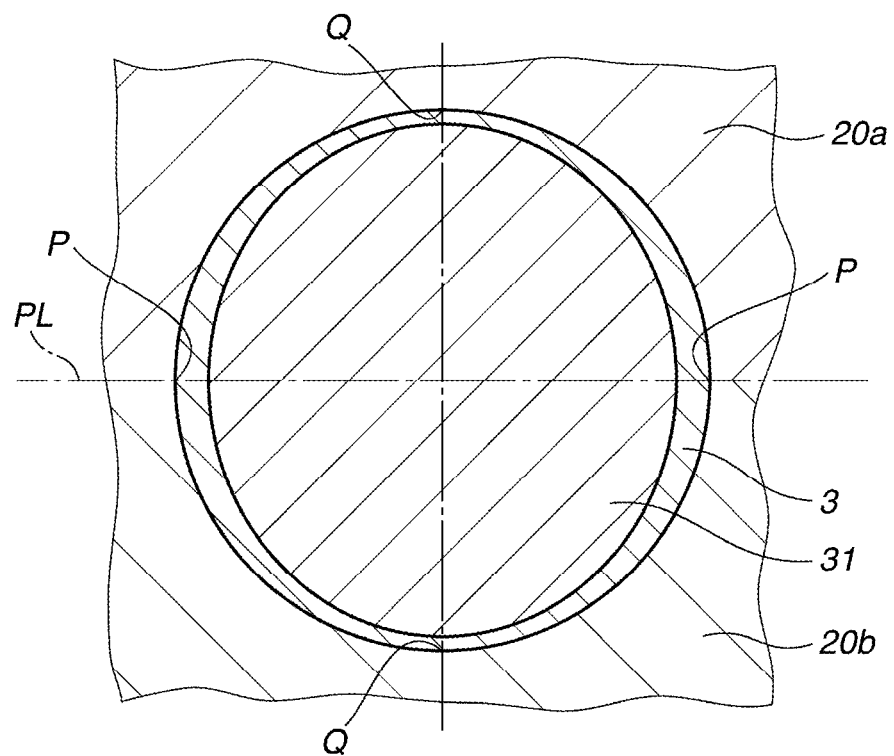

FIG. 5 presents enlarged cross-sectional views of the vicinity of the cavity in the mold shown in FIG. 4, FIG. 5A depicting the state prior to the injection of a resin into the cavity and FIG. 5B depicting the state when resin is being injected into the cavity.

DETAILED DESCRIPTION OF THE INVENTION

The golf ball mold of the invention is described more fully below in conjunction with the appended diagrams. The "parting line" and "parting surface" of a mold, as used in the description below, are defined as follows. The "parting line" is a line that indicates where the mold splits into a plurality of sections. For example, in the case of a mold that splits into two sections, the parting line refers to a line that indicates where the upper mold half and the lower mold half join together, and is rectilinear. The "parting surface" of the mold refers to the area of contact when the respective mold sections that have been separated based on the parting line join together. In a case where dimple-forming protrusions which lie across the parting line are provided on the parting surface, the parting surface has convex features due to the dimple-forming protrusions and also has concave features which correspond to the convex features. In the present invention, the shape of the parting surface may be suitably set according to the mold specifications, and is not subject to any particular limitation.

The golf ball mold of the invention has at least a parting surface that is based on a golf ball equator-based mold parting line; the number of sections into which the mold splits may be suitably set according to the mold specifications and is not particularly limited. For example, in cases where the number of parting surfaces in the mold is small, such as in a two-part mold having a single parting surface, mold production costs and restrictions on the dimple configuration can be reduced. On the other hand, in cases where a plurality of parting surfaces are provided and the mold splits into a larger number of sections, the releasability of the molded article from the mold can be improved. The number, position and the like of the support pins for supporting the center sphere within the cavity during molding may be suitably set according to such considerations as the mold specifications and the dimple design on the golf balls to be molded, and are not subject to any particular limitation. For the sake of simplicity, the mold described below to illustrate the invention is a two-part mold wherein the mold body splits into an upper mold half and a lower mold half at a parting surface that is based on a golf ball equator-based mold parting line.

Figure 1:
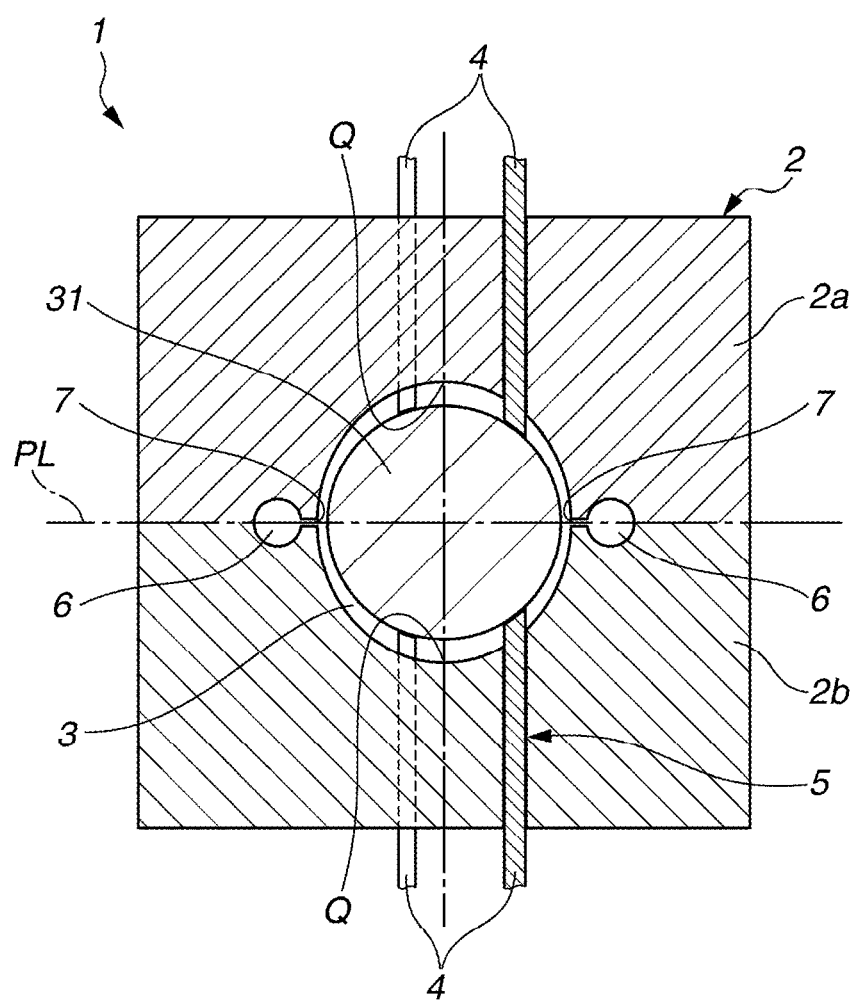

FIG. 1 shows an embodiment of the mold for injection-molding a golf ball according to the present invention. This diagram depicts the state prior to the injection of a cover-forming material into the cavity.

The mold 1 of the invention shown in FIG. 1 has a basic configuration which is substantially similar to that of the conventional mold 10 described above. That is, this mold 1 includes a mold body 2 configured as an upper mold half 2a and a lower mold half 2b which part at a parting line PL that is based on a golf ball equator and removably mate to form an interior cavity 3 for molding a golf ball, the cavity 3 having an inner wall with numerous dimple-forming protrusions provided thereon; and support pins 4 which are extendable and retractable within pin insertion holes 5 that communicate with the cavity 3. The support pins 4 extend into the cavity 3 to support a center sphere 31 and, in the retracted state, have end faces which define a portion of the inner wall of the cavity 3. Moreover, although not shown in the diagram, a total of six support pins 4 are provided at evenly spaced positions, three in the upper mold half 2a and three in the lower mold half 2b.

In the mold 1, runners 6 and resin gates 7 with channels of given sizes (areas) are formed along the parting surface of the mold body 2 so as to enable a known cover-forming material to be injected between the inner wall of the cavity 3 and the center sphere 31 from a known injection molding machine (not shown). Next, with injection of the cover-forming material, the support pins 4 that were extended into the cavity 3 are retracted, after which cooling is carried out, thereby completing molding of the cover.

Up to this point, the mold 1 of the invention is substantially similar to that of the earlier described conventional mold 10. However, a distinctive feature of the inventive mold 1 is the shape of the cavity 3. This feature is described in detail below in conjunction with the accompanying diagrams.

Figure 2A:
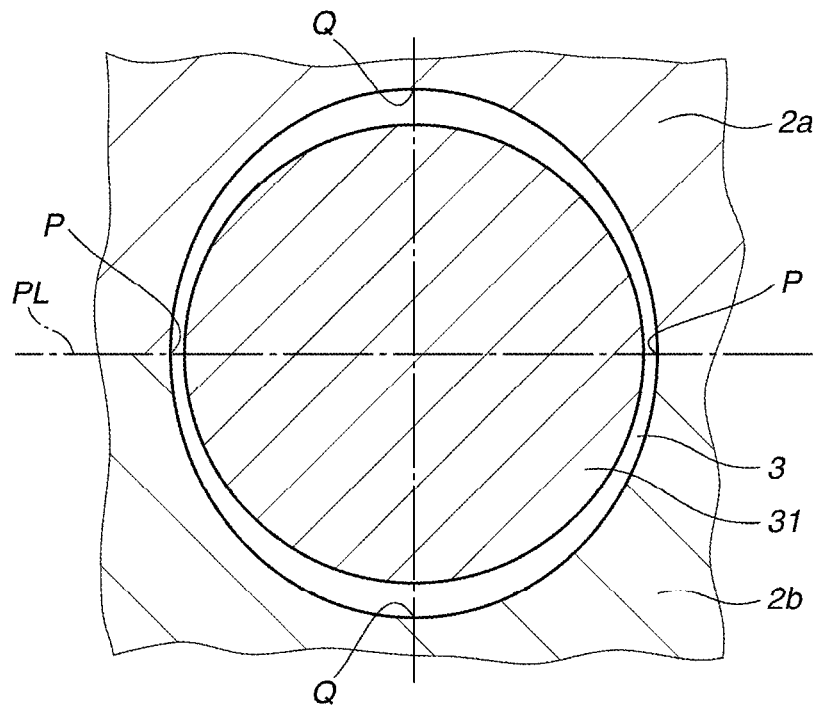
Figure 2B:
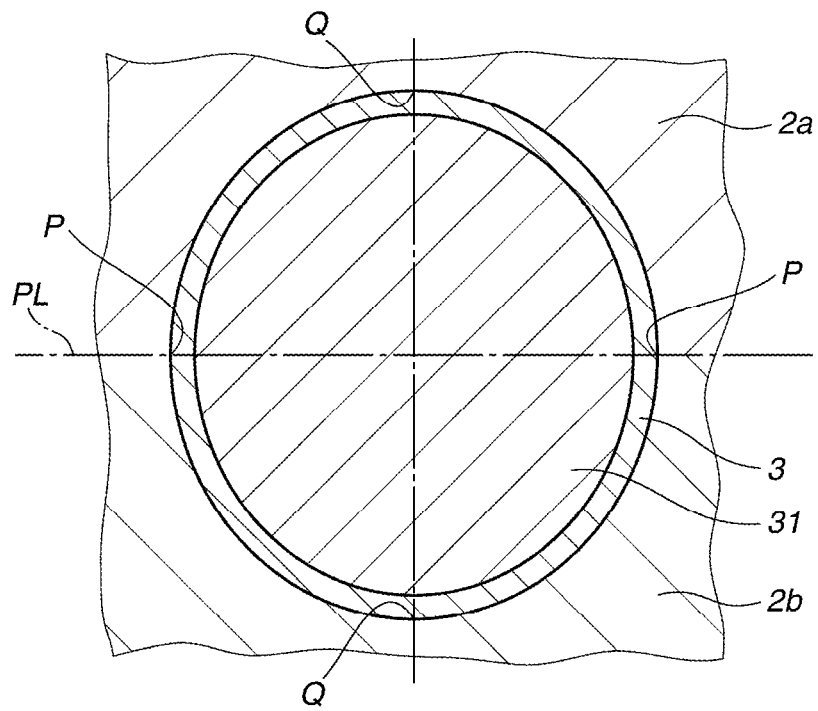

FIG. 2 shows an enlarged cross-sectional view of the vicinity of the cavity 3 in the mold 1 shown in FIG. 1. For the sake of simplicity, the cross-section shown in FIG. 2 does not include certain elements which appear in FIG. 1, such as the support pins 4 and resin gates 7. FIG. 2A shows the state prior to the injection of resin into the cavity 3, and FIG. 2B shows the state while resin is being injected into the cavity 3. Also, in FIG. 2, the symbol Q represents poles of the inner wall of the cavity 3 in a vertical direction, and the symbol P represents poles of the inner wall of the cavity 3 in a horizontal direction. The latter poles P lie on the equator of the inner wall of the cavity 3.

Figure 3:
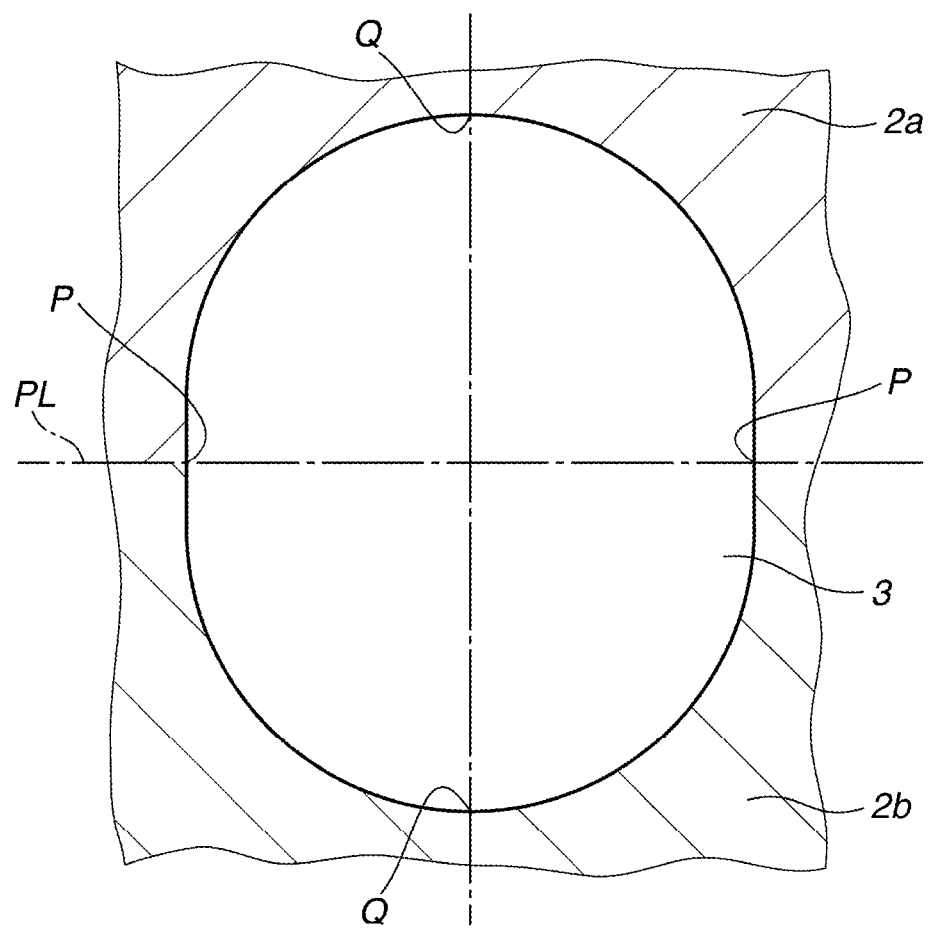
FIG. 3 is an enlarged cross-sectional view of the vicinity of the cavity in a mold for injection-molding a golf ball according to another embodiment of the invention.

In FIG. 2A, the center sphere 31 is held at the center of the cavity 3 by support pins (not shown). At this time, the center sphere 31 has a spherical shape, whereas the inner wall of the cavity 3 is shaped as an ellipsoidal surface which, based on a true spherical shape, has a vertical diameter connecting both poles Q, Q in a vertical direction that is longer than a horizontal diameter connecting both poles P, P in a horizontal direction, and thus is longer overall in the vertical direction. Hence, at this time, the interval between the inner wall of the cavity 3 and the center sphere 31 in the vicinity of both poles Q, Q in the vertical direction is wider than the interval therebetween in the vicinity of both poles P, P in the horizontal direction. Moreover, in this invention, the shape of the inner wall of the cavity, provided that the vertical diameter is made longer than the horizontal diameter, is not subject to any particular limitation, and may be an ellipsoidal surface, an approximately ellipsoidal surface, or, as shown in FIG. 3, a surface with an approximately ellipsoidal cross-sectional shape having a pair of mutually opposed hemispherical segments and a pair of mutually opposed straight segments.

Next, when resin is injected into the cavity 3, the resin flows in from the resin gates (not shown) which are formed along the parting surface and, as shown in FIG. 2B, fills the gap between the inner wall of the cavity 3 and the center sphere 31. At this time, because pressure from the horizontal direction acts upon the center sphere 31, the sphere 31 changes in shape from a true sphere to an approximate ellipsoid that is longer in the vertical direction. Hence, the interval between the inner wall of the cavity 3 and the center sphere 31 widens near both poles P, P in the horizontal direction, whereas the interval between the inner wall of the cavity 3 and the center sphere 31 narrows near both poles Q, Q in the vertical direction. However, because the inner wall of the cavity 3 has been shaped as an ellipsoidal surface to conform to the deformation of the center sphere 31, the interval between the inner wall of the cavity 3 and the center sphere 31 becomes everywhere uniform. As a result, a cover having a uniform thickness forms over the center sphere 31.

By setting the vertical diameter so as to be longer than the horizontal diameter, enough space is secured for the resin to flow into the region near both poles Q, Q in the vertical direction in spite of the deformation of the center sphere 31 to an approximate ellipsoid that is longer in the vertical direction. Therefore, molding defects of the sort that occurred during molding with the conventional mold 10 described above do not arise. Moreover, because there are no places within the cavity 3 where resin flow becomes difficult during molding, molding can be carried out at a low injection speed and pressure and at a low molding temperature. As a result, the generation of molding flash and resin discoloration can be minimized, enabling the efficiency of the finishing operation and the production yield to be improved.

The relationship between the vertical diameter and the horizontal diameter is not subject to any particular limitation, provided the vertical diameter is made longer than the horizontal diameter. However, the difference between the vertical diameter and the horizontal diameter is set to preferably at least 0.02 mm, more preferably at least 0.05 mm, and even more preferably at least 0.1 mm. There is no upper limit in the difference between the vertical diameter and the horizontal diameter, although this difference is set to preferably not more than 0.5 mm, more preferably not more than 0.4 mm, and even more preferably not more than 0.3 mm. The vertical diameter and the horizontal diameter are the lengths measured on a hypothetical surface were the inner wall of the cavity 3 assumed to have no dimple-forming protrusions thereon (in cases where the shape of the cavity is an ellipsoidal surface, the hypothetical ellipsoidal surface were the inner wall of the cavity assumed to have no dimple-forming protrusions thereon).

Although not shown here, after demolding, because the center sphere 31 reverts from an approximate ellipsoid to a true sphere when the pressure that acted upon it during molding is released, the ball ultimately becomes spherical overall, enabling a ball of excellent symmetry to be obtained.

With regard to the number of resin gates 7, from the standpoint of dispersing the injection pressure and also more reliably filling the resin into the cavity 3, it is recommended that at least four such ports be formed at evenly spaced positions along the parting plane of the mold 1. The number of resin gates 7 may be set to preferably from about 4 to about 24.

No particular limitation is imposed on the material used to make the inventive mold for injection-molding a golf ball, although a known steel material may be suitably used.

When a golf ball is injection-molded using the inventive mold for injection-molding a golf ball, molding may be carried out by a method and under conditions similar to those employed when using a conventional mold. More specifically, when the two-part mold 1 shown in FIG. 1 is used, first a center sphere 31 is placed inside the cavity 3 of the mold 1 and the center sphere 31 is supported by support pins 4 provided in the mold 1. Next, a known cover-forming material is injected, through runners 6 and resin gates 7, between the center sphere 31 and the inner wall of the cavity 3 while at the same time retracting the support pins 4. Cooling and solidification are then carried out, following which the upper and lower mold halves are separated and the molding is removed. The molding thus obtained is gate cut and gate treatment is carried out in the usual manner to remove molding flash, thereby giving a golf ball having a cover of one or more layer formed over a core. At this time, simultaneous with formation of the cover, numerous dimples corresponding to the shape and arrangement of the dimple-forming protrusions on the inside wall of the cavity 3 are formed on the surface of the molded ball. To enhance the design and durability of the golf ball, the surface of the golf ball thus obtained may be subjected to various treatments such as stamping and painting by known methods.

The molding conditions may be suitably set according to, for example, the formulation of the cover-forming material and the thickness of the cover to be formed, and are not subject to any particular limitation. However, it is recommended that the cylinder temperature be set within the following range.

The cylinder temperature may be suitably set according to factors such as the material formulation, and is not subject to any particular limitation. However, the temperature at the highest temperature place may be set to preferably at least 200° C., and more preferably at least 220° C. There is no particular upper limit, although the temperature may be set to preferably not more than 280° C., and more preferably not more than 250° C.

The materials for forming the center sphere and the cover are described below.

First, in cases where the center sphere is, for example, the core of a two-piece solid golf ball, it is obtained by vulcanizing a rubber composition composed primarily of a rubber material. Specifically, use may be made of a rubber composition containing, for example, a base rubber, a crosslinking initiator and a co-crosslinking agent.

The base rubber of the rubber composition is not subject to any particular limitation, although the use of polybutadiene is preferred. Preferred use may be made of cis-1,4 polybutadiene having a cis structure content of at least 40%. If desired, other rubbers such as natural rubber, polyisoprene rubber or styrene-butadiene rubber may be suitably compounded with the above polybutadiene in the base rubber.

Preferred use may be made of an organic peroxide as the crosslinking initiator in the invention. Illustrative examples of suitable organic peroxides include 1,1-di(t-butylperoxy) cyclohexane, 1,1-bis-t-butylperoxy-3,3,5-trimethylcyclohexane, dicumyl peroxide, di(t-butylperoxy)-m-diisopropylbenzene and 2,5-dimethyl-2,5-di-t-butylperoxyhexane. A commercial product may be used as the organic peroxide. Examples of such products include Perhexa C-40, Perhexa 3M-40, Percumyl D (all available from NOF Corporation) and Trigonox 29-40 (Kayaku Akzo Corporation). These crosslinking initiators are compounded in an amount which, although not subject to any particular limitation, is preferably at least 0.1 part by weight, and more preferably at least 0.3 part by weight, per 100 parts by weight of the base rubber. The upper limit is preferably not more than 5 parts by weight, and more preferably not more than 2 parts by weight.

The co-crosslinking agent used in the invention may be, for example, a metal salt of an unsaturated fatty acid such as methacrylic acid or acrylic acid (e.g., zinc salts, magnesium salts, calcium salts), or an ester compound such as trimethylolpropane trimethacrylate. To obtain a high rebound in particular, preferred use may be made of zinc acrylate. The amount of such co-crosslinking agents included per 100 parts by weight of the base rubber, although not subject to any particular limitation, may be set to at least 10 parts by weight, and preferably at least 15 parts by weight, but not more than 50 parts by weight, and preferably not more than 40 parts by weight.

In addition, various types of additives may be optionally included in the above composition, examples of such additives being sulfur, antioxidants, zinc oxide, barium sulfate, the zinc salt of pentachlorothiophenol and zinc stearate. No particular limitation is imposed on the amounts in which these additives are included.

The core diameter, although not subject to any particular limitation, may be set to preferably at least 32.0 mm, and more preferably at least 33.0 mm, but preferably not more than 41.5 mm, and more preferably not more than 41.0 mm.

Next, the cover-forming material which forms the cover is not subject to any particular limitation, although preferred use may be made of a resin composition containing a known thermoplastic resin as the base resin. More specifically, a thermoplastic resin or a thermoplastic elastomer may be preferably used as the base resin. Exemplary thermoplastic resins include ionomer resins. A commercial product may be used as the ionomer resin. Illustrative examples of commercial ionomer resins that may be used in this invention include Himilan (available from DuPont-Mitsui Polychemicals Co., Ltd.), Surlyn (E.I. DuPont de Nemours & Co.) and Iotek (Exxon). Illustrative examples of thermoplastic elastomers include polyester-type thermoplastic elastomers, polyamide-type thermoplastic elastomers, polyurethane-type thermoplastic elastomers, olefin-type thermoplastic elastomers, and styrene-type thermoplastic elastomers. A commercial product may be used as the thermoplastic elastomer. Illustrative examples of commercial thermoplastic elastomers that may be used in the invention include Hytrel (available from DuPont-Toray Co., Ltd.), Pelprene (Toyobo Co., Ltd.), Pebax (Toray Industries, Inc.), Pandex (DIC Corporation), Santoprene (Monsanto Chemical Co.), Tuftec (Asahi Chemical Industry Co., Ltd.), and Dynaron (JSR Corporation). In this invention, preferred use may be made of an ionomer resin or a thermoplastic polyurethane elastomer as the above thermoplastic resin or thermoplastic elastomer.

Where necessary, an inorganic filler such as titanium oxide may be included in the cover-forming material. The amount included, although not subject to any particular limitation, may be set to from 0.01 to 5 parts by weight per 100 parts by weight of the base resin.

Various additives other than the above inorganic fillers, such as ultraviolet absorbers, antioxidants and metal soaps, may also be suitably included in the cover-forming material.

The thickness of the cover may be suitably set according to the construction and materials of the golf ball to be manufactured, and is not subject to any particular limitation, although the thickness may be set to preferably from 0.3 to 2.0 mm, more preferably from 0.5 to 1.7 mm, and even more preferably from 0.6 to 1.5 mm.

When manufacturing a multi-piece solid golf ball having a cover of two or more layers formed over the core, a sphere composed of the core encased by one or more intermediate layer (a layer other than the outermost layer of the cover) is used as the center sphere. The material forming the intermediate layer is not subject to any particular limitation; use may be made of a material similar to the above-described cover-forming material.

In the golf ball manufactured by the above method, the shape, number and arrangement of the dimples formed on the surface may be suitably set according to the ball specifications, and are not subject to any particular limitations. For example, the dimple shape may be suitably selected from among not only circular shapes, but also non-circular polygonal shapes, dewdrop shapes and oval shapes. The diameter of the above dimples, although not particularly limited, is preferably set in the range of 0.5 to 6 mm. In addition, the dimple depth, although not particularly limited, is preferably set in the range of 0.05 to 0.4 mm.

No particular limitation is imposed on the surface coverage by the dimples on the surface of the ball. However, from the standpoint of the aerodynamic properties, the surface coverage is preferably set to at least 70%, more preferably at least 75%, and even more preferably at least 80%. By using the mold of the invention, balls having a high surface coverage can be easily manufactured.

Although preferred embodiments of the invention have been described above in conjunction with the diagrams, the inventive mold for injection-molding a golf ball is not limited by the diagrams and the above embodiments and may be suitably modified within the spirit and scope of the present invention. That is, the shapes of the parting surfaces of the mold, the number of sections into which the mold splits, and the number and positioning of the support pins may be varied within ranges that do not depart from the spirit and scope of the invention. In addition, it is also possible to optionally add known pins and the like.

As explained above, the inventive mold for injection-molding a golf ball resolves a molding problem that arose particularly when molding the outermost cover layer of a golf ball and thus enables the cover to be stably molded, and moreover makes it possible to easily and reliably obtain golf balls of high symmetry in which a cover of uniform thickness has been formed. In addition, by using the inventive mold for injection-molding a golf ball, molding can be carried out at a low injection speed and pressure and a low molding temperature, thus minimizing both the generation of molding flash and resin discoloration, and also making it possible to increase the efficiency of the finishing operations and improve the production yield.

EXAMPLES

The invention is illustrated more fully below by using the mold of the invention to manufacture golf balls, although the invention is not limited by the following Examples.

Examples 1 and 2

Comparative Examples 1 to 4

Solid cores were produced by preparing rubber compositions of the formulations shown in Table 1 below, then molding and vulcanizing the compositions at 155° C. for 10 minutes. The diameters of the cores produced are shown in Table 4.

TABLE 1

|  |  | Core |
| --- | --- | --- |
| Formulation | Polybutadiene rubber | 100 |
| (parts by weight) | Organic peroxide | 1.2 |
|  | Zinc oxide | 26.7 |
|  | Antioxidant | 0.1 |
|  | Zinc acrylate | 27.6 |
|  | Zinc salt of pentachlorothiophenol | 0.2 |

Details on the ingredients in Table 1 are given below.
Polybutadiene rubber: Available under the trade name "BR 730" from JSR Corporation
Organic peroxide: 1,1-Bis(t-butylperoxy)cyclohexane, available under the trade name "Perhexa C-40" from NOF Corporation
Zinc oxide: Available from Sakai Chemical Co., Ltd.
Antioxidant: Available under the trade name "Nocrac NS-6" from Ouchi Shinko Chemical Industry Co., Ltd.
Zinc acrylate: Available from Nippon Shokubai Co., Ltd.

Next, using the intermediate layer-forming materials formulated as shown in Table 2, an intermediate layer was injection-molded under ordinary conditions over the core produced as described above, thereby giving a center sphere 31. The thicknesses of the intermediate layer formed in the respective Working Examples of the invention and the Comparative Examples are shown in Table 4.

TABLE 2

|  |  | Intermediate layer |
| --- | --- | --- |
| Formulation | Nucrel AN4319 | 30 |
| (parts by weight) | Nucrel AN4221C | 60 |
|  | Dynaron 6100P | 10 |
|  | Magnesium stearate | 60 |
|  | Magnesium oxide | 1.3 |

Details on the ingredients in Table 2 are given below.
Nucrel: Ethylene-based polymers available from DuPont-Mitsui Polychemicals Co., Ltd.
Dynaron: A hydrogenated polymer available from JSR Corporation The center sphere 31 thus obtained (a sphere composed of a core encased by one intermediate layer) was placed inside the cavity 3 of the inventive mold 1 shown in FIG. 1, along with which this center sphere 31 was supported by the supports pins 4 provided in the mold 1. Next, a cover-forming material formulated as shown in Table 3 was injected, through the runners 6 and resin gates 7, between the center sphere 31 and the inner walls of the cavity, and the support pins were retracted. After the resin had cooled and solidified, the upper and lower mold halves were separated and the molding was removed. The molding was then gate cut, following which molding flash was removed by grinding treatment in the usual manner. In the Comparative Examples, a cover was formed in the same way as described above, but using the conventional mold 10 shown in FIG. 4. The molding conditions in the respective Working Examples of the invention and the Comparative Examples are shown in Table 4. Numerous dimples were formed in the same arrangement on the surfaces of the golf balls in each of the Working Examples and the Comparative Examples.

TABLE 3

|  |  | Cover |
|---|---|---|
| Formulation | Himilan 1601 | 50 |
| (parts by weight) | Himilan 1557 | 50 |

Details on the ingredients in Table 3 are given below.
Himilan: Ionomer resins available from DuPont-Mitsui Polychemicals Co., Ltd.

The molding was examined immediately after demolding, and rated according to the following criteria.
  Small
  Moderate
Ball Diameter:
  After the molding was taken out of the mold, molding flash was removed and the diameter of the resulting ball in both the polar (vertical) direction and the equatorial (horizontal) direction was measured.

The following was confirmed from the results in Table 4.
  In Comparative Example 1, the resin did not fill the mold cavity properly near both poles in the vertical direction, as a result of which molding could not be carried out.
  In Comparative Example 2, the cylinder temperature was high, as a result of which discoloration of the resin was observed.
  In Comparative Example 3, the resin did not fill the molding cavity properly near both poles in the vertical direction, as a result of which molding could not be carried out.
  In Comparative Example 4, the cylinder temperature was high, as a result of which resin discoloration of the resin was observed. In addition, even when the injection speed and dwell were increased, the resin did not fill the mold cavity properly near both poles in the vertical direction, as a result of which molding could not be carried out.

TABLE 4

|  |  | Example | | Comparative Example | | | |
|---|---|---|---|---|---|---|---|
|  |  | 1 | 2 | 1 | 2 | 3 | 4 |
| Core diameter (mm) | | 37.3 | 37.3 | 37.3 | 37.3 | 37.3 | 37.3 |
| Intermediate layer thickness (mm) | | 1.5 | 1.7 | 1.5 | 1.5 | 1.7 | 1.7 |
| Cavity | Cross-sectional shape | elliptical | elliptical | circular | circular | circular | circular |
|  | Vertical diameter (mm) | 43.01 | 43.01 | 42.86 | 42.86 | 42.86 | 42.86 |
|  | Horizontal diameter (mm) | 42.86 | 42.86 | 42.86 | 42.86 | 42.86 | 42.86 |
|  | Vertical diameter − Horizontal diameter (mm) | 0.15 | 0.15 | 0 | 0 | 0 | 0 |
| Cover thickness (mm) | | 1.2 | 1.0 | 1.2 | 1.2 | 1.0 | 1.0 |
| Molding conditions | Injection speed (%) | 100 | 145 | 100 | 127 | 145 | 145 |
|  | Cylinder temperature (° C.) | 230 | 250 | 230 | 260 | 250 | 260 |
| Evaluation | Moldability | good | good | NG | good | NG | NG |
|  | Resin color | good | good | good | NG | good | NG |
|  | Size of flash | small | moderate | — | moderate | — | — |
|  | Ball diameter Vertical direction (mm) | 42.7 | 42.7 | — | 42.7 | — | — |
|  | Horizontal direction (mm) | 42.7 | 42.7 | — | 42.7 | — | — |

Details on the items in Table 4 are given below.
Injection Speed:
  The results are expressed relative to an arbitrary value of 100% for the injection speed in Comparative Example 1.
Cylinder Temperature:
  The results are expressed as the temperature at the highest temperature place on the cylinder.
Moldability:
  The surface of the ball was visually examined, and rated according to the following criteria.
    Good: Thorough filling of the resin occurred, including near both poles in the vertical direction.
    NG: Thorough filling of the resin did not occur near both poles in the vertical direction.
Resin Color:
  The surface of the ball was visually examined, and rated according to the following criteria.
  Good: No discoloration
  NG: Some discoloration
Size of Molding Flash:

The invention claimed is:
1. A method of manufacturing a golf ball using a mold for injection-molding a golf ball, the mold comprising:
  a plurality of mold sections which have at least a parting surface that is based on a golf ball equator-based mold parting line and removably mate to form an interior cavity for molding the golf ball, the cavity having an inner wall with a plurality of dimple-forming protrusions provided thereon,
  wherein at least four resin gates are formed along the parting surface that is based on a golf ball equator-based mold parting line, and
  the inner wall has a vertical diameter connecting two poles of the cavity in a vertical direction thereof and a horizontal diameter connecting two poles of the cavity in a horizontal direction thereof, the vertical diameter being longer than the horizontal diameter,
  the method comprising the step of molding a cover by placing a center sphere in the mold cavity formed by removably mating the plurality of mold sections which have at least a parting surface that is based on a golf ball equator-based mold parting line, supporting the center sphere with a support pin provided in the mold, and injecting a cover-forming material between the center sphere and the cavity inner wall while at the same time retracting the support pin.

2. The method of claim 1, wherein the vertical diameter is at least 0.02 mm longer than the horizontal diameter.

3. The method of claim 1, wherein the inner wall of the cavity has a shape which is an approximately ellipsoidal surface that is longer in the vertical direction.

4. The method of claim 1, wherein the difference between the vertical diameter and the horizontal diameter is from 0.02 to 0.5 mm.

5. A method of manufacturing a golf ball comprising the step of molding a cover by placing a center sphere in the mold cavity formed by removably mating the plurality of mold sections which have at least a parting surface that is based on a golf ball equator-based mold parting line, supporting the center sphere with a support pin provided in the mold, and injecting a cover-forming material between the center sphere and the cavity inner wall while at the same time retracting the support pin,
wherein the following mold for injection-molding the golf ball is used:
at least four resin gates are formed along the parting surface that is based on a golf ball equator-based mold parting line,
the inner wall has a vertical diameter connecting two poles of the cavity in a vertical direction thereof and a horizontal diameter connecting two poles of the cavity in a horizontal direction thereof, the vertical diameter being longer than the horizontal diameter,
the inner wall of the cavity has a shape which is an approximately ellipsoidal surface that is longer in the vertical direction, and
the vertical diameter is at least 0.02 mm longer than the horizontal diameter,
the process comprising the steps of:
injecting the resin from the resin gate,
pressuring from the horizontal direction acts upon the center sphere, changing in shape the sphere from a true sphere to an approximate ellipsoid that is longer in the vertical direction,
widening the interval between the inner wall of the cavity and the center sphere near two poles of the cavity in a horizontal direction thereof, whereas narrowing the interval between the inner wall of the cavity and the center sphere near two poles of the cavity in a vertical direction thereof, becoming the interval between the inner wall of the cavity and the center sphere everywhere uniform.

6. A method of manufacturing a golf ball comprising the step of molding a cover by placing a center sphere in the mold cavity formed by removably mating the plurality of mold sections which have at least a parting surface that is based on a golf ball equator-based mold parting line, supporting the center sphere with a support pin provided in the mold, and injecting a cover-forming material between the center sphere and the cavity inner wall while at the same time retracting the support pin,
wherein the following mold for injection-molding the golf ball is used:
at least four resin gates are formed along the parting surface that is based on a golf ball equator-based mold parting line,
the inner wall has a vertical diameter connecting two poles of the cavity in a vertical direction thereof and a horizontal diameter connecting two poles of the cavity in a horizontal direction thereof, the vertical diameter being longer than the horizontal diameter,
the inner wall of the cavity has a shape which is an approximately ellipsoidal surface that is longer in the vertical direction, and
the vertical diameter is at least 0.02 mm longer than the horizontal diameter,
the process comprising the steps of:
injecting the resin from the resin gate,
pressuring from the horizontal direction acts upon the center sphere, changing in shape the sphere from a true sphere to an approximate ellipsoid that is longer in the vertical direction,
widening the interval between the inner wall of the cavity and the center sphere near two poles of the cavity in a horizontal direction thereof, whereas narrowing the interval between the inner wall of the cavity and the center sphere near two poles of the cavity in a vertical direction thereof, becoming the interval between the inner wall of the cavity and the center sphere everywhere uniform,
wherein the thickness of the cover is from 0.3 to 2.0 mm.

* * * * *